US008782435B1

(12) United States Patent
Ghose (10) Patent No.: US 8,782,435 B1
(45) Date of Patent: *Jul. 15, 2014

(54) SYSTEM AND METHOD FOR VALIDATING PROGRAM EXECUTION AT RUN-TIME USING CONTROL FLOW SIGNATURES (75) Inventor: Kanad Ghose, Vestal, NY (US)

(73) Assignee: The Research Foundation for The State University of New York, Binghamton, NY (US)

(*) Notice: Subject to any disclaimer, the term of this patent is extended or adjusted under 35 U.S.C. 154(b) by 284 days.

This patent is subject to a terminal disclaimer.

(21) Appl. No.: 13/183,954

(22) Filed: Jul. 15, 2011

Related U.S. Application Data

(60) Provisional application No. 61/364,798, filed on Jul. 15, 2010.

(51) Int. Cl.
*G06F 9/44* (2006.01)
*G06F 9/38* (2006.01)
*G06F 11/14* (2006.01)
*G06F 11/36* (2006.01)
*G06F 21/74* (2013.01)
*H04L 9/32* (2006.01)
*G06F 21/52* (2013.01)

(52) U.S. Cl.
CPC ............ *G06F 9/3851* (2013.01); *G06F 9/3834* (2013.01); *G06F 11/1407* (2013.01); *G06F 11/3612* (2013.01); *G06F 21/74* (2013.01); *G06F 21/52* (2013.01)
USPC ........... 713/190; 713/176; 713/189; 713/193; 713/194; 711/118; 711/119; 711/146; 712/213; 712/214; 712/215; 712/216

(58) Field of Classification Search
USPC ................... 713/176, 189, 190, 194; 726/26; 717/124, 168; 711/128, 152; 712/213–216, 227
See application file for complete search history.

(56) References Cited

U.S. PATENT DOCUMENTS

| 5,944,821 A | 8/1999 | Angelo |
| 6,070,239 A | 5/2000 | McManis |
| 6,938,164 B1 | 8/2005 | England et al. |
| 7,444,601 B2 | 10/2008 | Proudler et al. |
| 7,490,250 B2 | 2/2009 | Cromer et al. |
| 7,490,352 B2 | 2/2009 | Kramer et al. |

(Continued)

OTHER PUBLICATIONS

S. W. Smith and S.H. Weingart. Building a high performance, programmable secure coprocessor. In Computer Networks (Special Issue on Computer Network Security), vol. 31, pp. 831-860, Apr. 1999.

(Continued)

*Primary Examiner* — Amare F Tabor
*Assistant Examiner* — Noura Zoubair
(74) *Attorney, Agent, or Firm* — Steven M. Hoffberg; Ostrolenk Faber LLP (57) ABSTRACT

A processor comprising: an instruction processing pipeline, configured to receive a sequence of instructions for execution, said sequence comprising at least one instruction including a flow control instruction which terminates the sequence; a hash generator, configured to generate a hash associated with execution of the sequence of instructions; a memory configured to securely receive a reference signature corresponding to a hash of a verified corresponding sequence of instructions; verification logic configured to determine a correspondence between the hash and the reference signature; and authorization logic configured to selectively produce a signal, in dependence on a degree of correspondence of the hash with the reference signature.

35 Claims, 2 Drawing Sheets

(56) References Cited

U.S. PATENT DOCUMENTS

| | | | |
|---|---|---|---|
| 7,571,312 B2 | 8/2009 | Scarlata et al. | |
| 7,590,869 B2 | 9/2009 | Hashimoto | |
| 7,603,707 B2 | 10/2009 | Seifert et al. | |
| 7,694,139 B2 | 4/2010 | Nachenberg et al. | |
| 7,725,703 B2 | 5/2010 | Hunter et al. | |
| 7,730,312 B2 | 6/2010 | Everett et al. | |
| 7,734,921 B2 | 6/2010 | Lotspiech | |
| 7,739,517 B2 | 6/2010 | Sahita et al. | |
| 2004/0162989 A1* | 8/2004 | Kirovski | 713/189 |
| 2008/0034350 A1* | 2/2008 | Conti | 717/124 |
| 2008/0215920 A1 | 9/2008 | Mayer et al. | |
| 2009/0217050 A1 | 8/2009 | Amiel et al. | |
| 2010/0281239 A1* | 11/2010 | Sudhakar et al. | 712/222 |

OTHER PUBLICATIONS

William A. Arbaugh, David J. Farbert, Jonathan M. Smith, "A Secure and Reliable Bootstrap Architecture" (1997), Proceedings of the 1997 IEEE Symposium on Security and Privacy.

Sean W. Smith, Elaine R. Palmer, Steve Weingart, "Building a high-performance, programmable secure coprocessor", Computer Networks (1999).

Elaine Shi, Adrian Perrig, Leendert Van Doom, "BIND: A Fine-grained Attestation Service for Secure Distributed Systems" (2005), IEEE Symposium on Security and Privacy.

Tal Garfinkel, Mendel Rosenblum, "A Virtual Machine Introspection Based Architecture for Intrusion Detection" (2003), Proc. Network and Distributed Systems Security Symposium.

Sean W. Smith, Vernon Austel, "Trusting Trusted Hardware: Towards a Formal Model for Programmable Secure Coprocessors" USENIX (1998).

G. Edward Suh and Dwaine Clarke and Blaise Gassend and Marten Van Dijk and Srinivas Devadas, "Efficient Memory Integrity Verification and Encryption for Secure Processors", Proceedings of the 36th Annual International Symposium on Microarchitecture (2003), pp. 339-350.

TPM specification 1.2 Revision 103, published on Jul. 9, 2007.

Chen and Morris, "Certifying Program Execution with Secure Processors", Proceedings of the 9th conference on Hot Topics in Operating Systems, USENIX, vol. 9, pp. 133-138, 2003.

Vivek Haldar, Deepak Chandra and Michael Franz, "Semantic Remote Attestation—A Virtual Machine directed approach to Trusted Computing", USENIX Virtual Machine Research and Technology Symposium, May 2004.

Joshua N. Edmison, "Hardware Architectures for Software Security", Ph.D Thesis, Virginia Polytechnic Institute and State University (2006).

Bryan Parno Jonathan M. McCune Adrian Perrig, "Bootstrapping Trust in Commodity Computers", IEEE Symposium on Security and Privacy, May 2010.

TCPA. www.trustedcomputing.org/.

B. Gassend, D. Clarke, M. Van Dijk, and S. Devadas. Controlled physical random functions. In Proceedings of the 18th Annual Computer Security Applications Conference, Dec. 2002.

D. Lie, C. A. Thekkath, M. Mitchell, P. Lincoln, D. Boneh, J. C. Mitchell, and M. Horowitz. Architectural support for copy and tamper resistant software. In Proceedings of Conference on Architectural Support for Programming Languages and Operating Systems (ASPLOS), pp. 168-177, 2000.

U. Maheshwari, R. Vingralek, and W. Shapiro. How to build a trusted database system on untrusted storage. In Proceedings of the 4th USENIX Symposium on Operating Systems Design and Implementation, pp. 135-150, Oct. 2000.

E. Suh, D. Clarke, B. Gassend, M. van Dijk, and S. Devadas. The AEGIS processor architecture for tamper evident and tamper resistant processing. Technical Report LCS-TM-461, Massachusetts Institute of Technology, Feb. 2003.

E. Suh, D. Clarke, B. Gassend, M. van Dijk, and S. Devadas. Hardware mechanisms for memory authentication. Technical Report LCS-TM-460, Massachusetts Institute of Technology, Feb. 2003.

S. Weingart. Physical security for the μABYSS system. In Proceedings of the IEEE Computer Society Conference on Security and Privacy, pp. 38-51, 1987.

B. Yee. Using secure coprocessors. PhD thesis, Carnegie Mellon University, May 1994.

Michael E. Locasto, "Micro-speculation, Micro-sandboxing, and Self-Correcting Assertions: Support for Self-Healing Software and Application Communities", PhD Thesis Proposal, Department of Computer Science, Columbia University, Dec. 5, 2005.

Tal Garfinkel and Ben Pfaff and Jim Chow and Mendel Rosenblum and Dan Boneh, "Terra: a virtual machine-based platform for trusted computing", ACM Press 2003, pp. 193-206.

William A. Arbaugh, David J. Farbert, Jonathan M. Smith, "A Secure and Reliable Bootstrap Architecture" (1997), Proceedings of the 1997 IEEE Symposium on Security and Privacy.

Nick L. Petroni and Jr. Timothy and Fraser Jesus and Molina William and A. Arbaugh, "Copilot—a coprocessor-based kernel runtime integrity monitor", Proceedings of the 13th USENIX Security Symposium, 2004, pp. 179-194.

Bennett Yee, "Using Secure Coproessors" (1994).

Elaine Shi, Adrian Perrig, Leendert Van Doom, "BIND: A Fine-grained Attestation Service for Secure Distributed Systems" (2005), IEEE Symposium on Security and Privacy.

Tal Garfinkel, Mendel Rosenblum, "A Virtual Machine Introspection Based Architecture for Intrusion Detection" (2003), Proc. Network and Distributed Systems Security Symposium.

G. Edward Suh and Dwaine Clarke and Blaise Gassend and Marten van Dijk and Srinivas Devadas, "Hardware Mechanisms for Memory Integrity Checking" (2002).

Sean W. Smith, Vernon Austel, "Trusting Trusted Hardware: Towards a Formal Model for Programmable Secure Coprocessors" USENIX (1998).

G. Edward Suh, Dwaine Clarke, Blaise Gassend, Marten van Dijk, Srinivas Devadas, "AEGIS: Architecture for Tamper-Evident and Tamper-Resistant Processing", Computation Structures Group Memo 474 2004.

Edward Suh, Dwaine Clarke, Blaise Gassend, Marten van Dijk, Srini Devadas, "AEGIS: Architecture for Tamper-Evident and Tamper-Resistant Processing", Submission to the Proceedings of the 17th International Conference on Supercomputing, Computation Structures Group Memo 461 12003).

G. Edward Suh and Dwaine Clarke and Blaise Gassend and Marten Van Dijk and Srinivas Devadas, "Efficient Memory Integrity Verification and Encryption for Secure Processors", Proceedings 0f the 36th Annual International Symposium on Microarchitecture (2003), pp. 339-350.

Gang Xu and Cristian Borcea and Liviu Iftode, "Satem: Trusted service code execution across transactions", Proc. IEEE Int. Symp. Reliable Distributed Systems, (2006).

Joseph Zambreno and Alok Choudhary, "SAFE-OPS: An approach to embedded software security", ACM Transactions on Embedded Computing Systems (TECS), vol. 4, Issue 1 (2005).

Marten Van Dijk and Luis F. G. Sarmenta and Jonathan Rhodes and Srinivas Devadas, "Securing Shared Untrusted Storage by using TPM 1.2 Without Requiring a Trusted OS", (2007).

Dan Williams and Emin Gün Sirer, "Optimal Parameter Selection for Efficient Memory Integrity Verification Using Merkle Hash trees", Proceedings. Third IEEE International Symposium on Network Computing and Applications, 2004. (NCA 2004).

Marten Van Dijk and Luis F. G. Sarmenta and Charles W. O'donnell and Srinivas Devadas, "Proof of Freshness: How to efficiently use on online single secure clock to secure shared untrusted memory", (2006).

S. W. Smith and J. D. Tygar, "Security and Privacy for Partial Order Time", ISCA Seventh International Conference on Parallel and Distributed Computing Systems, (1994), pp. 70-79.

Michael E. Locasto and Stelios Sidiroglou and Angelos D. Keromytis, "Speculative Virtual Verification: PolicyConstrained Speculative Execution", Proceedings of the 14th New Security Paradigms Workshop (NSPW 2005), pp. 1-19.

(56) References Cited

OTHER PUBLICATIONS

Nick L. Petroni and Jr. Timothy and Fraser Aaron and Walters William and A. Arbaugh, "An architecture for specification-based detection of semantic integrity violations in kernel dynamic data", Proceedings of the USENIX Security Symposium (2006), pp. 289-304.

Gang Xu and Cristian Borcea and Liviu Iftode, "Satem: Trusted service code execution across transactions", Proc. IEEE Int. Symp. Reliable Distributed Systems (2006).

Jonathan M. McCune and Bryan Parno and Adrian Perrig and Michael K. Reiter and Hiroshi Isozaki, "Flicker: An Execution Infrastructure for TCB Minimization", (2008).

\* cited by examiner

Fig. 1
Prior Art (a) Basic blocks in the module (b) Basic blocks execution sequences – a "+" following a basic block label denotes one or more executions of that basic block

SYSTEM AND METHOD FOR VALIDATING PROGRAM EXECUTION AT RUN-TIME USING CONTROL FLOW SIGNATURES

CROSS REFERENCE TO RELATED APPLICATIONS

The present application claims benefit of priority from U.S. Provisional Patent Application Ser. No. 61/364,798, filed Jul. 15, 2010, the entirety of which is expressly incorporated herein by reference.

FIELD OF THE INVENTION

The present invention relates to systems and methods for secure computing.

BACKGROUND OF THE INVENTION

Current computer systems are highly vulnerable to cyber attack. The number of attacks and the financial losses due to those attacks have risen exponentially. Despite significant investments, the situation continues to worsen; novel attacks appear with high frequency and employ increasingly sophisticated techniques. There are very few fundamental sources of the vulnerabilities exploited by cyber attackers. These attacks stem from the fact that current computer systems cannot enforce the intended semantics of their computations. In particular, they fail to systematically enforce: Memory safety, Type safety, The distinction between code and data, and Constraints on information flow and access. These properties are not systematically enforced today because they are not: Systematically captured during the design process; Formally analyzed or verified during design and implementation; Captured or enforced by common system programming languages (e.g., the C programming language); and Represented explicitly within the runtime environment of the system and therefore cannot be enforced dynamically by either hardware or software techniques.

Current system software is large and complex. Hardware architectures provide mechanisms to protect the kernel from user code, but at the same time grant to the kernel unlimited privileges (at best, a few levels of increased privilege). Consequently, a single penetration into the kernel gives the attacker unlimited access. Since the cost of switching into kernel mode is high, there is a tendency for system programmers to move increasing amounts of functionality into the kernel, making it even less trustworthy and exposing an even larger attack surface. Likewise, programming flaws can result in unintended access to kernel or increased privilege level system access.

Current computer systems lack the means to recover from attacks either by finding alternative methods for achieving their goals or by repairing the resources corrupted by the attack. They also typically lack the ability to diagnose the underlying problem and to fix the vulnerabilities that enabled the attack. Once a machine is corrupted, manual repairs by specialized personnel are required while the forensic information necessary to affect the repair is typically lacking. A particular issue is that, once a system is corrupted, it cannot be subsequently trusted, and therefore a remediation facility is difficult to implement. Finally, today's computer systems are nearly identical to one another, do not change appreciably over time, and share common vulnerabilities. A single network-based attack can therefore spread rapidly and affect a very large number of computers.

A central requirement for implementing trusted computing platforms is to validate whether a program executing on a potentially untrusted host is really the program the user thinks it is. If the host platform and its software environment are potentially compromised, the application may be compromised either through static replacement of the binaries or though linking—either statically or dynamically—the application dynamically to untrusted library functions or through dynamic code substitution at run time. What makes the validation problem particularly difficult is the compromises that occur at run time. One way to validate the execution is to verify that the results produced by the execution on a data set are essentially the same results that are produced when a validated, reference copy of the program is run on a trusted host and produces the same result with the same input data set. Such a validation is practically infeasible, as the execution of the validated program obviates the need for execution on the original, potentially untrusted host. Another approach will be to continuously monitor changes/updates to the various software components and to only permit changes that have been certified as legitimate. Unfortunately, this approach results in a fairly closed system that takes out the convenience of timely, automatic or semi-automatic updates and introduces a potential administration headache. Existing approaches to validating the execution of a program include the use of hardware support in the form of the Trusted Platform Module (TPM), the use of control flow signatures at run time, with control flow signatures derived from the contents of both register and memory locations as well as the contents of hardware instrumentation registers.

The art has proposed various means for addressing this problem. For example, software testing techniques based on control flow signatures. However, these are slow, and encryption makes this problem worse. Without encryption, the scheme suffers from an intrinsic vulnerability. Another technique employs hardware-support for debugging and validation of executed code. See, US 2008/0215920, expressly incorporated herein by reference, and discussed in more detail below. Software techniques are available for authenticating executions. These may have limited coverage, and may incur delay and increased overhead. Hybrid techniques, such as a combination of software techniques and TPM hardware to certify code before execution is also possible, but this may fail to detect run-time compromises.

Today's computing systems consist of a large number of hardware and software components. Assuming that the hardware components are certified by the vendors, the software components are the major sources of vulnerability. These software components start with the operating systems and related services, library components, utilities and the applications themselves. Any one of these software components can be compromised and can act directly or indirectly as sources of attacks that can change the execution characteristics of a user's program at run time. Examples of such compromises include the alteration of transfer vectors at run time, to transfer control to unintended functions, alteration of the binaries of the application itself ("code injection") at run-time, call(s) to compromised system functions, and so on. The net result of any of these techniques is that the user's program does not correctly perform its intended functions, even though the users are completely oblivious to that fact. To detect such compromises, it is necessary to validate the execution of the entire program at run time, including the validation of library functions, kernel functions and utilities. Such validations ultimately lead to a trusted computing environment, where a system is composed of components that can be potentially compromised and where any compromise can be detected in a timely fashion to prevent any adverse impact of any form.

"Trusted Platform Module" is the name of a published specification detailing a secure cryptoprocessor that can store cryptographic keys that protect information, as well as the general name of implementations of that specification, often called the "TPM chip". The TPM specification is the work of the Trusted Computing Group. The current version of the TPM specification is 1.2 Revision 103, published on Jul. 9, 2007.

The Trusted Platform Module offers facilities for the secure generation of cryptographic keys, and limitation of their use, in addition to a hardware pseudo-random number generator. It also includes capabilities such as remote attestation and sealed storage. "Remote attestation" creates a nearly unforgeable hash key summary of the hardware and software configuration. The extent of the summary of the software is decided by the program encrypting the data. This allows a third party to verify that the software has not been changed. "Binding" encrypts data using the TPM endorsement key, a unique RSA key burned into the chip during its production, or another trusted key descended from it. [3] "Sealing" encrypts data similar to binding, but in addition specifies a state in which the TPM must be in order for the data to be decrypted (unsealed).

A Trusted Platform Module can be used to authenticate hardware devices. Since each TPM chip has a unique and secret RSA key burned in as it is produced, it is capable of performing platform authentication. For example, it can be used to verify that a system seeking access is the expected system.

The Trusted Platform Module is typically part of the supporting chipset for a processor system, and thus its use typically delays execution of instructions by the processor until verification is completed. Likewise, verification occurs with respect to instructions before they are cached by the processor. Thus, while the TMP provides secure data processing, it does not address insecurities in moving instructions to the processor, and is susceptible to instruction injection type attaches, and likewise introduces significant latencies.

Generally, pushing the security down to the hardware level in conjunction with software provides more protection than a software-only solution that is more easily compromised by an attacker. However even where a TPM is used, a key is still vulnerable while a software application that has obtained it from the TPM is using it to perform encryption/decryption operations, as has been illustrated in the case of a cold boot attack.

The "Cerium" technology (Chen and Morris, "Certifying Program Execution with Secure Processors", Proceedings of the 9th conference on Hot Topics in Operating Systems, USENIX, Volume 9, Pages: 133-138, 2003), expressly incorporated herein by reference, proposes a secure processor technology which validates cache line signature before commencement of processing. It provides a separate security co-processor, which is not integrated into main processing pipeline. Cerium computes signatures of the system software as it boots up, and the software at each stage self checks its integrity against a reference signature stored in the co-processor's non-volatile memory. Each stage also authenticates the software for the next stage. Cerium assumes the existence and use of a cache where operating system and trusted code can be kept. See, also, Cliff Wang, *Malware Detection*, Advances in information security, Mihai Christodorescu, Somesh Jha, Douglas Maughan, Dawn Song, Cliff Wang, Editors, Springer, 2006.

Boneh et al., "Hardware Support for Tamper-Resistant and Copy-Resistant Software", Technical Report: CS-TN-00-97, (Stanford University, 2000), expressly incorporated herein by reference, provides a description of a hardware prototype which supports software-only taper resistant computing, with an atomic decrypt-and-execute operation.

U.S. Pat. No. 7,730,312, expressly incorporated herein by reference, provides a tamper resistant module certification authority. Software applications may be securely loaded onto a tamper resistant module (TRM) and securely deleted from the TRM. A method for determining, based at least upon an encrypted personalization data block, whether a TRM is part of a qualified set of TRM's to accept loading of an application is also provided. Thereafter, the method provides for loading the application onto the TRM only after the first step determines that the TRM is qualified to accept the loading of the application. A method is also provided for determining, based at least upon an encrypted personalization data block, whether a TRM is part of a qualified set of TRM's to accept deleting of an application. Thereafter, the method provides for deleting the application from the TRM only when the first step determines that the TRM is qualified to accept the deleting of the application.

U.S. Pat. No. 7,590,869, expressly incorporated herein by reference, provides an on-chip multi-core type tamper resistant microprocessor, which has a feature that, on the microprocessor package which has a plurality of instruction execution cores on an identical package and an ciphering processing function that can use a plurality of ciphering keys in correspondence to programs under a multi-task program execution environment, a key table for storing ciphering keys and the ciphering processing function are concentrated on a single location on the package, such that it is possible to provide a tamper resistant microprocessor in the multi-processor configuration that can realize the improved processing performance by hardware of a given size compared with the case of providing the key table and the ciphering processing function distributedly.

U.S. Pat. No. 7,739,517, expressly incorporated herein by reference, provides a secure hardware device which compares code image with a known good code image, using a co-processor separate from the processor, which halts execution of code until it is verified. Reference code or its signature is stored in secure, separate storage, but is not itself encrypted. The separate co-processor is not integrated into main processing pipeline to avoid significant delays.

U.S. Pat. No. 7,734,921, expressly incorporated herein by reference, provides a system and method for guaranteeing software integrity via combined hardware and software authentication. The system enables individual user devices to authenticate and validate a digital message sent by a distribution center, without requiring transmissions to the distribution center. The center transmits the message with an appended modulus that is the product of two specially selected primes. The transmission also includes an appended authentication value that is based on an original message hash value, a new message hash value, and the modulus. The new message hash value is designed to be the center's public RSA key; a corresponding private RSA key is also computed. Individual user devices combine a digital signet, a public modulus, preferably unique hardware-based numbers, and an original message hash to compute a unique integrity value K. Subsequent messages are similarly processed to determine new integrity values K', which equal K if and only if new messages originated from the center and have not been corrupted.

U.S. Pat. No. 7,725,703, expressly incorporated herein by reference, provides Systems and methods for securely booting a computer with a trusted processing module (TPM). In a computer with a TPM, an expected hash value of a boot component may be placed into a platform configuration register (PCR), which allows a TPM to unseal a secret. The secret may then be used to decrypt the boot component. The hash of the decrypted boot component may then be calculated and the result can be placed in a PCR. The PCRs may then be compared. If they do not, access to the an important secret for system operation can be revoked. Also, a first secret may be accessible only when a first plurality of PCR values are extant, while a second secret is accessible only after one or more of the first plurality of PCR values has been replaced with a new value, thereby necessarily revoking further access to the first secret in order to grant access to the second secret.

U.S. Pat. No. 7,694,139, expressly incorporated herein by reference, provides a TPM for securing executable content. A software development system (SDS) executes on a computer having a TPM, and digitally signs software. The platform includes protected areas that store data and cannot be accessed by unauthorized modules. A code signing module executing in a protected area obtains a private/public key pair and a corresponding digital certificate. The SDS is configured to automatically and transparently utilize the code signing module to sign software produced by the system. End-user systems receive the certificate with the software and can use it to verify the signature. This verification will fail if a parasitic virus or other malicious code has altered the software.

U.S. Pat. No. 7,603,707, expressly incorporated herein by reference, provides a Tamper-aware virtual TPM, in which respective threads comprising a virtual TPM thread and a security-patrol threads are executed on a host processor. The host processor may be a multi-threaded processor having multiple logical processors, and the respective threads are executed on different logical processors. While the virtual TPM thread is used to perform various TPM functions, the security-patrol thread monitors for physical attacks on the processor by implementing various numerical calculation loops, wherein an erroneous calculation is indicative of a physical attack. In response to detection of such an attack, various actions can be taken in view of one or more predefined security policies, such as logging the event, shutting down the platform and/or informing a remote management entity.

U.S. Pat. No. 7,571,312, expressly incorporated herein by reference, provides methods and apparatus for generating endorsement credentials for software-based security coprocessors. A virtual manufacturer authority is launched in a protected portion of a processing system. A key for the virtual manufacturer authority is created. The key is protected by a security coprocessor of the processing system, such as a TPM. Also, the key is bound to a current state of the virtual manufacturer authority. A virtual security coprocessor is created in the processing system. A delegation request is transmitted from the processing system to an external processing system, such as a certificate authority (CA). After transmission of the delegation request, the key is used to attest to trustworthiness of the virtual security coprocessor.

U.S. Pat. No. 7,490,352, expressly incorporated herein by reference, provides systems and methods for verifying trust or integrity of executable files. The system determines that an executable file is being introduced into a path of execution, and then automatically evaluates it in view of multiple malware checks to detect if the executable file represents a type of malware. The multiple malware checks are integrated into an operating system trust verification process along the path of execution.

U.S. Pat. No. 7,490,250, expressly incorporated herein by reference, provides a system and method for detecting a tamper event in a trusted computing environment. The computer system has an embedded security system (ESS), a trusted operating system. A tamper signal is received and locked in the ESS. The trusted operating system is capable of detecting the tamper signal in the ESS.

U.S. Pat. No. 7,444,601, expressly incorporated herein by reference, provides a trusted computing platform, in which a trusted hardware device is added to the motherboard, and is configured to acquire an integrity metric, for example a hash of the BIOS memory of the computing platform. The trusted hardware device is tamper-resistant, difficult to forge and inaccessible to other functions of the platform. The hash can be used to convince users that that the operation of the platform (hardware or software) has not been subverted in some way, and is safe to interact with in local or remote applications. The main processing unit of the computing platform is directed to address the trusted hardware device, in advance of the BIOS memory, after release from 'reset'. The trusted hardware device is configured to receive memory read signals from the main processing unit and, in response, return instructions, in the native language of the main processing unit, that instruct the main processing unit to establish the hash and return the value to be stored by the trusted hardware device. Since the hash is calculated in advance of any other system operations, this is a relatively strong method of verifying the integrity of the system. Once the hash has been returned, the final instruction calls the BIOS program and the system boot procedure continues as normal. Whenever a user wishes to interact with the computing platform, he first requests the integrity metric, which he compares with an authentic integrity metric that was measured by a trusted party. If the metrics are the same, the platform is verified and interactions can continue. Otherwise, interaction halts on the basis that the operation of the platform may have been subverted.

U.S. Pat. No. 6,938,164, expressly incorporated herein by reference, provides a system and method for allowing code to be securely initialized in a computer. A memory controller prevents CPUs and other I/O bus masters from accessing memory during a code (for example, trusted core) initialization process. The memory controller resets CPUs in the computer and allows a CPU to begin accessing memory at a particular location (identified to the CPU by the memory controller). Once an initialization process has been executed by that CPU, the code is operational and any other CPUs are allowed to access memory (after being reset), as are any other bus masters (subject to any controls imposed by the initiated code).

U.S. Pat. No. 6,070,239, expressly incorporated herein by reference, provides a system and method for executing verifiable programs with facility for using non-verifiable programs from trusted sources. The system has a class loader that prohibits the loading and execution of non-verifiable programs unless (A) the non-verifiable program resides in a trusted repository of such programs, or (B) the non-verifiable program is indirectly verifiable by way of a digital signature on the non-verifiable program that proves the program was produced by a trusted source. Verifiable architecture neutral programs are Java bytecode programs whose integrity is verified using a Java bytecode program verifier. The non-verifiable programs are generally architecture specific compiled programs generated with the assistance of a compiler. Each architecture specific program typically includes two signatures, including one by the compiling party and one by the compiler. Each digital signature includes a signing party identifier and an encrypted message. The encrypted message includes a message generated by a predefined procedure, and is encrypted using a private encryption key associated with the signing party. A digital signature verifier used by the class loader includes logic for processing each digital signature by obtaining a public key associated with the signing party, decrypting the encrypted message of the digital signature with that public key so as generate a decrypted message, generating a test message by executing the predefined procedure on the architecture specific program associated with the digital signature, comparing the test message with the decrypted message, and issuing a failure signal if the decrypted message digest and test message digest do not match.

U.S. Pat. No. 5,944,821, expressly incorporated herein by reference, provides a secure software registration and integrity assessment in a computer system. The method provides secure registration and integrity assessment of software in a computer system. A secure hash table is created containing a list of secure programs that the user wants to validate prior to execution. The table contains a secure hash value (i.e., a value generated by modification detection code) for each of these programs as originally installed on the computer system. This hash table is stored in protected memory that can only be accessed when the computer system is in system management mode. Following an attempt to execute a secured program, a system management interrupt is generated. An SMI handler then generates a current hash value for the program to be executed. In the event that the current hash value matches the stored hash value, the integrity of the program is guaranteed and it is loaded into memory and executed. If the two values do not match, the user is alerted to the discrepancy and may be given the option to update or override the stored hash value by entering an administrative password.

U.S. 2008/0215920, expressly incorporated herein by reference, provides a processor which generates a signature value indicating a sequence of executed instructions, and the signature value is compared to signature values calculated for two or more possible sequences of executed instructions to determine which instruction sequence was executed. The signature is generated via a signature generator during program execution, and is provided external to the processor via a signature message. There is, in this system, no encryption of a stored signature, nor use of a secret key. The trace message storage unit is operable to store instruction pointer trace messages and executed instruction signature messages. The trace message storage unit is also operable to store messages in at least one of an on-chip or an off-chip trace memory. The executed instruction signature unit is operable to generate a cache line content signature. The signature may be generated via a signature generator during program execution, and provided external to the processor via a signature message such as by using a trace memory or buffer and a tool scan port.

Figure 1:
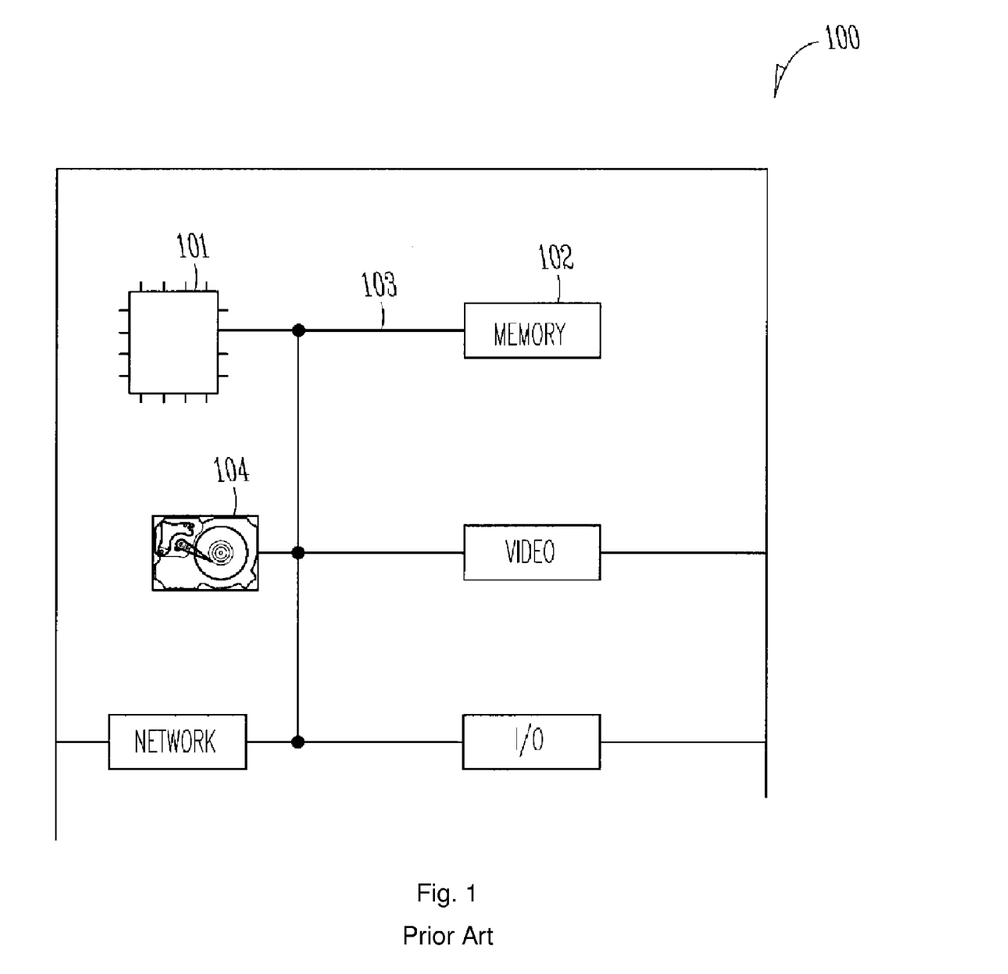
FIG. 1 illustrates a prior art network with a transmitter and a plurality of receivers.

FIG. 1 of U.S. Patent Application 2008/0215920 (prior art) is a block diagram of a computer system, as may be used to practice various embodiments of the invention. A computer system 100 is in some embodiments a general-purpose computer, such as the personal computer that has become a common tool in business and in homes. In other embodiments, the computer 100 is a special purpose computer system, such as an industrial process control computer, a car computer, a communication device, or a home entertainment device. The computer comprises a processor 101, which is operable to execute software instructions to perform various functions. The memory 102 and processor 101 in further embodiments include a smaller, faster cache memory which is used to store data that is recently used, or that is believed likely to be used in the near future. The software instructions and other data are stored in a memory 102 when the computer is in operation, and the memory is coupled to the processor by a bus 103. When the computer starts, data stored in nonvolatile storage such as a hard disk drive 104 or in other nonvolatile storage such as flash memory is loaded into the memory 102 for the processor's use.

In many general purpose computers, an operating system is loaded from the hard disk drive 104 into memory and is executed in the processor when the computer first starts, providing a computer user with an interface to the computer so that other programs can be run and other tasks performed. The operating system and other executing software are typically stored in nonvolatile storage when the computer is turned off, but are loaded into memory before the program instructions can be executed. Because memory 102 is significantly more expensive than most practical forms of nonvolatile storage, the hard disk drive or other nonvolatile storage in a computerized system often stores much more program data than can be loaded into the memory 102 at any given time. The result is that only some of the program data stored in nonvolatile memory for an executing program, operating system, or for other programs stored in nonvolatile memory can be loaded into memory at any one time. This often results in swapping pieces of program code into and out of memory 102 from the nonvolatile storage 104 during program execution, to make efficient use of the limited memory that is available.

Many modern computer systems use methods such as virtual memory addresses that are mapped to physical memory addresses and paged memory to manage the limited available physical memory 102. Virtual memory allows use of a larger number of memory address locations than are actually available in a physical memory 102, and relies on a memory management method to map virtual addresses to physical memory addresses as well as to ensure that the needed data is loaded into the physical memory. Needed data is swapped into and out of physical memory as needed by loading memory in pages, which are simply large segments of addressable memory that are moved together as a group. Memory management units within the processor or chipset architecture can also change the contents of memory or cache during program execution, such as where new data is needed in memory or is predicted to be needed and the memory or cache is already full.

An executing program may complete execution of all the needed program instructions in a particular page loaded into memory, and proceed to execute more instructions stored in another page. In a typical example, the previously executing page is swapped out of memory and the page containing the newly needed program code is loaded into memory in its place, enabling the processor to continue to execute program instructions from memory. This not only complicates memory management, but complicates debugging executing software as the program code stored in any particular physical memory location might be from any number of different pages with different virtual addresses. Further, program code loaded into memory need not be stored in the same physical memory location every time, and the actual physical address into which a program instruction is stored is not necessarily unique.

US 2009/0217050, expressly incorporated herein by reference, provides systems and methods to optimize signature verification time for a cryptographic cache. Time is reduced by eliminating at least some of the duplicative application of cryptographic primitives. In some embodiments, systems and methods for signature verification comprise obtaining a signature which was previously generated using an asymmetrical cryptographic scheme, and determining whether an identical signature has previously been stored in a signature cache. If an identical signature has been previously stored in the signature cache, retrieving previously generated results corresponding to the previously stored identical signature, the results a consequence of application of cryptographic primitives of the asymmetrical cryptographic scheme corresponding to the identical signature. The results are forwarded to a signature verifier. In at least some embodiments, at least one of these functions occurs in a secure execution environment. Examples of a secure execution environment, without limitation, include an ARM TRUSTZONE® architecture, a trusted platform module (TPM), Texas Instruments' M-SHIELD™ security technology, etc. Secure execution environment comprises signature cache and at least a portion of security logic. Security logic in turn comprises signature look-up, calculator, hash function and signature verifier, although it should be readily apparent that more or different functions and modules may form part of security for some embodiments. The device obtains the signature (and message) from unsecure environment and promptly presents them to security logic for vetting. Embodiments employ signature look-up to check signature cache to determine whether the specific signature has been presented before. If the specific signature has indeed been previously presented, signature look-up retrieves the corresponding results of the previous utilization of cryptographic primitives corresponding to the relevant digital signature scheme being employed, which results were previously stored at the identified location in signature cache, and forwards the results to signature verifier. Among those results is the hash value of the previous message that is part of the previous signature. Signature verifier calls hash function to perform a hash on newly obtained message, and compares the hash value of the newly obtained message with the hash value retrieved from signature cache. If there is a match, the signature is verified and the message is forwarded for further processing, e.g., uploading into NVM or RAM as the case may be, etc. Thus, execution is commenced after verification.

Vivek Haldar, Deepak Chandra and Michael Franz, "Semantic Remote Attestation—A Virtual Machine directed approach to Trusted Computing", USENIX Virtual Machine Research and Technology Symposium, May 2004, provides a method for using language-based virtual machines which enables the remote attestation of complex, dynamic, and high-level program properties, in a platform-independent way.

Joshua N. Edmison, "Hardware Architectures for Software Security", Ph.D Thesis, Virginia Polytechnic Institute and State University (2006), proposes that substantial, hardware-based software protection can be achieved, without trusting software or redesigning the processor, by augmenting existing processors with security management hardware placed outside of the processor boundary. Benefits of this approach include the ability to add security features to nearly any processor, update security features without redesigning the processor, and provide maximum transparency to the software development and distribution processes.

Bryan Parno Jonathan M. McCune Adrian Perrig, "Bootstrapping Trust in Commodity Computers", IEEE Symposium on Security and Privacy, May 2010, provides a method for providing information about a computer's state, as part of an investigation of trustworthy computing.

A cryptographic hash function is a deterministic procedure that takes an arbitrary block of data and returns a fixed-size bit string, the (cryptographic) hash value, such that an accidental or intentional change to the data will change the hash value. The data to be encoded is often called the "message", and the hash value is sometimes called the message digest or simply digest. The ideal cryptographic hash function has four main or significant properties: it is easy to compute the hash value for any given message, it is infeasible to find a message that has a given hash, (and thus there is an asymmetry between encoding and decoding), it is infeasible to modify a message without changing its hash, and, it is infeasible to find two different messages with the same hash. Cryptographic hash functions have many information security applications, notably in digital signatures, message authentication codes (MACs), and other forms of authentication. They can also be used as ordinary hash functions, to index data in hash tables, for fingerprinting, to detect duplicate data or uniquely identify files, and as checksums to detect accidental data corruption. Indeed, in information security contexts, cryptographic hash values are sometimes called (digital) fingerprints, checksums, or just hash values, even though all these terms stand for functions with rather different properties and purposes.

In cryptography, MD5 (Message-Digest algorithm 5) is a widely used cryptographic hash function with a 128-bit hash value. Specified in RFC 1321 (expressly incorporated herein by reference), MD5 has been employed in a wide variety of security applications, and is also commonly used to check the integrity of files. However, it has been shown that MD5 is not collision resistant; as such, MD5 is not suitable for applications like SSL certificates or digital signatures that rely on this property. An MD5 hash is typically expressed as a 32-digit hexadecimal number. The SHA-2 family of hash functions may also be used, which have a higher level or security.

Most cryptographic hash functions are designed to take a string of any length as input and produce a fixed-length hash value. A cryptographic hash function is ideally able to withstand cryptanalytic attack. As a minimum, it should have the following properties: Preimage resistance: Given a hash h, it should be hard to find any message m such that h=hash(m). This concept is related to that of a one-way function. Functions that lack this property are vulnerable to preimage attacks. Second preimage resistance: Given an input $m_1$ it should be hard to find another input $m_2$, where $m_1 \neq m_2$, such that hash($m_1$)=hash($m_2$). This property is sometimes referred to as weak collision resistance, and functions that lack this property are vulnerable to second preimage attacks. Collision resistance: It should be hard to find two different messages $m_1$ and $m_2$ such that hash($m_1$)=hash($m_2$). Such a pair is called a cryptographic hash collision, a property which is sometimes referred to as strong collision resistance. It requires a hash value at least twice as long as that required for preimage-resistance, otherwise collisions may be found by a so-called birthday attack. These properties imply that a malicious adversary cannot replace or modify the input data without changing its digest. Thus, if two strings have the same digest, one can be very confident that they are identical.

Ideally, one may wish for even stronger conditions. It should be impossible for an adversary to find two messages with substantially similar digests; or to infer any useful information about the data, given only its digest. Therefore, a cryptographic hash function should behave as much as possible like a random function while still being deterministic and efficiently computable. Checksum algorithms, such as CRC32 and other cyclic redundancy checks, are designed to meet much weaker requirements, and are generally unsuitable as cryptographic hash functions. See, en.wikipedia.org/wiki/Cryptographic_hash_function.

An important application of secure hashes is verification of message integrity. Determining whether any changes have been made to a message or file, for example, can be accomplished by comparing message digests calculated before, and after, transmission (or any other event). For this reason, most digital signature algorithms only confirm the authenticity of a hashed digest of the message to be "signed". Verifying the authenticity of a hashed digest of the message is considered proof that the message itself is authentic. One of the main applications of a hash function is to allow the fast look-up of a data in a hash table.

BRIEF DESCRIPTION OF THE DRAWINGS

For a detailed description of exemplary embodiments of the invention, reference will be made to the accompanying drawings in which.

SUMMARY OF THE INVENTION

According to a preferred embodiment of invention, a signature defined by a state of a processor as a result of the execution of instructions in a processor is verified within the processor.

A relatively simple hardware mechanism is provided to validate the execution of a program continuously, as it executes. This mechanism not only validates the execution of the application, but also validates the execution of library functions and the kernel. The hardware enhancements required to implement the technique are very modest, and the execution overhead is negligible in most cases. There is also some compiler support provided for pre-execution analysis of the validated software components.

The hardware can be readily retrofitted into an existing datapath, to support the continuous validation of a program (and the libraries that it uses) as it executes. This provides immunity against compromises that can occur at run-time.

Compiler support for deriving full-coverage signatures of the binaries is provided through a static analysis of the binaries.

This system provides architectural support for authenticating program executions and thus lay down the foundation of building open, trusted computing systems. The solution has many potential applications, including, but not limited to:

Implementation of trustworthy distributed computing systems (including distributed embedded systems) composed of potentially untrusted components.

Validation of downloaded updates or applications on a device to ensure that they are legitimate and do not compromise the system at run time.

Limiting interpretation of secured data only with the permitted programs for accessing the data.

Distribution of software from a server to multiple clients, and permitting only a specific version of that software to be run. Any client that attempts to execute a disabled or obsolete version of the code cannot do so, and will be forced to obtain the intended software version. This is useful in maintaining large server pools.

The present system employs a number of assumptions regarding the system, a violation of which may reduce the security of the technique. These include:

1. It is possible to implement a root of trust mechanism, where a few core functions can always be trusted. The Trusted Platform Module (TPM) standard, currently implemented in chipsets and some embedded CPUs generally provides this capability.

2. It is possible to have a secure, non-volatile storage for some critical decryption/encryption keys. This is, again, a facility that is implemented in existing TPM hardware.

3. Access is available to clean, certified copies of software modules to derive their execution signatures.

The technique for continuous run-time validation of executing code validates that: The control flow path of an application, within the application and across other software components it invokes, are consistent with what is expected in the program; and, the instructions executed along the legal control flow path in between two consecutive branches are only the expected instructions.

The validations are particularly performed at instructions that can change the flow of control, when that instruction commits. In general, there are several types of instructions that can alter the flow of control: Conditional or unconditional branches; Computed branches, where the address of the branch target is computed at run-time; Indirect jumps through registers or memory locations (such as transfer vectors) to dynamically-linked libraries; and System calls and returns.

The determination of legal control flow paths in the program, as well as in the other functions that it invokes, are done statically, on a clean, reference version of the software.

On the other hand, this technique may also be used to profile characteristics of undesired program execution. Thus, the characteristics of undesired software can be determined, for example in a reference installation, and the pattern of flow control changes determined. In this case, if the pattern is revealed, a presumption of invalid execution is raised. This later case may lead to some inefficiency due to the number of tests that may be required to detect each possible undesired execution, however, using a statistical and/or behavioral analysis, the overhead may be maintained at an acceptable level.

According to a preferred embodiment of invention, the authenticity of a sequence of instructions in a processor is verified concurrently with execution of the instructions, and instruction processing is not substantially delayed as a result of verification. Thus, the verification may proceed in parallel with instruction execution. Advantageously, the verification acts to preempt execution of instructions partially executing in the instruction execution pipeline, but before commitment of execution.

The present technology lends itself to modern pipelined design, and exploits modern processor architectures, permitting initial stages of program execution to speculatively execute, with a contingent subsequent exception or flushing occurring dependent on the verification status. If the code sequence flow is validated, there is little or no delay in processing; if the verification fails, the pipeline is purged or other exception taken, thus providing the desired security.

In some embodiments, the verification need not merely flush the instruction pipeline, but in fact can provide a modification of instruction processing (similar to a vectored interrupt), such that the signature verification process can result in alternate execution results and/or pathways, rather than a simple go/nogo option for commitment of execution of a flow control instruction.

In accordance with one embodiment, the verification employs preexisting speculative execution logic of a pipelined processor, in which the verification flag takes the place of a more traditional branch flag. Alternately, logic generally corresponding to, but distinct from, preexisting conditional execution logic may be employed.

In case of a verification exception, a typical response will be a flushing of the processor instruction decode and execution pipeline, along with a flag which is handled by trusted code, such as a microkernel within the processor, or a call to secure BIOS or operating system code. For example, the processor may be restored to a known-good status checkpoint, which may be defined by hardware, trusted or previously verified software, or some combination.

This scheme can be used for a number of purposes, including:

1. Detection of malicious attempts to modify code.
2. Ensure that only certified code can run and provides detection at run-time tampering of such code.
3. Permit trustworthy code to be distributed and used.
4. Detect instruction corruption due to faults—permanent or transient.
5. Execute instructions with results dependent on a signature verification.

Likewise, the present scheme can also serve the various purposes known for other secure processing platforms, and may generally be used in conjunction with other known security technologies.

According to one embodiment, the system is responsive to codes, e.g., program instructions or other signals, to deactivate some or all of the security features, and thereby allow exceptions to the normal prohibitions and control mechanisms. Preferably, these codes are provided by the operating system or some other reliable entity, in order to provide authentication of the exceptions. For example, during normal booting of an operating system, files may be modified, and this exception mechanism permits such modifications. After the operating system has completed these modifications, the security features may be re-enabled. According to another embodiment, multiple alternate authentication mechanisms are provided, which are selectively applied under control of authenticated processes and instructions. Therefore, the system may employ multiple parallel or alternate instruction authentication schemes, and optionally operate for periods without an instruction authentication processes active.

It is therefore an object to provide a processor comprising: an instruction processing pipeline, configured to receive a sequence of instructions for execution, said sequence comprising at least one instruction including a flow control instruction which terminates the sequence; a hash generator, configured to generate a hash associated with execution of the sequence of instructions; a memory configured to securely receive a reference signature corresponding to a hash of a verified corresponding sequence of instructions; verification logic configured to determine a correspondence between the hash and the reference signature; and authorization logic configured to selectively produce a signal, in dependence on a degree of correspondence of the hash with the reference signature.

It is also an object to provide a processing method, comprising: providing a processor comprising an instruction processing pipeline, configured to receive a sequence of instructions for execution, said sequence comprising at least one instruction including a flow control instruction which terminates the sequence; generating a hash associated with execution of the sequence of instructions; securely receiving a reference signature corresponding to a hash of a verified corresponding sequence of instructions; determining a correspondence between the hash and the reference signature; and selectively producing a signal, in dependence on a degree of correspondence of the hash with the reference signature.

It is a further object to provide a system and method which executes purposeful sequences of instructions in accordance with a predetermined program, the program comprising blocks having defined entry points and terminal flow control instructions, each sequence of instructions between a legal entry point and a subsequent flow control instruction having an associated reference signature, wherein the associated reference signature is provided to a processor in protected, e.g., encrypted form, and compared against a hash derived from actual instruction execution of the block, wherein the terminal flow control instruction is selectively committed to execution in dependence on a result of the comparison. The reference signature is preferably called into the processor in encrypted form, and is, for example, decrypted using a secret key and compared to the hash derived from execution of the corresponding sequence of instructions, or compared to a hash derived from execution of the corresponding sequence of instructions which is then correspondingly encrypted to match the reference signature. In this way, an execution behavior of a program can be limited or controlled, thus providing security.

The processor may comprise a secure storage location configured to store a secret key to decrypt the reference signature. The secure storage location may comprise non-volatile memory integrated with the instruction processing pipeline.

The method may further comprise storing a secret key in a secure storage location to decrypt the reference signature. The reference signature may be is stored in a secure non-volatile memory on a circuit integrated with the instruction processing pipeline.

The sequence of instructions may comprise a sequence of instructions from an entry point to a next subsequent branch point.

The reference signature may correspond to a sequence of instructions between expected consecutive branch points substantially without unexpected flow control instructions.

A correspondence of the hash and the reference signature may be insufficient to authorize, i.e., fail to authorize, commitment of the instructions, if there is present in the sequence of instructions an unexpected flow control instruction between expected consecutive branch points.

The signal may selectively authorize commitment of execution of the flow control instruction, and a correspondence between the hash and the reference signature may be insufficient to authorize the commitment of execution of the flow control instruction if there is present in the sequence of instructions an unexpected flow control instruction between expected consecutive branch points.

A sequence of reference signatures may be stored in the memory for verifying consecutive segments of a program at runtime.

The flow control instruction may comprise at least one of a conditional branch, an unconditional branch, a computed branch, an indirect jump to a dynamically linked library, a system call and a return.

The reference signature may be generated by execution of a reference version of an executable program from which the sequence of instructions are derived.

Each legal flow path within a single execution module may be specified as a segment from an entry point or instruction that can change the flow of control to a next instruction that can change the flow of control, and wherein each segment has a predetermined reference signature.

The hash generator may compute a signature which is unique to the sequence of instructions.

The hash generator may compute a hash of at least codes corresponding to instructions executed at the point when the last instruction in the sequence of instructions commits. The hash may thus correspond to instructions executed at the point when the last instruction in the sequence of instructions commits The hash generator may compute a hash of at least codes corresponding to a behavior of the flow control instruction. The hash may thus the hash comprise a hash of at least codes corresponding to a behavior of the flow control instruction.

A table may be provided in which a plurality of reference signatures are stored in encrypted form. The table may have an entry for every flow control instruction in a program module that can change the flow of control. The entry for each flow control instruction in the table may store one reference signature for each path that leads into the sequence of instructions which that instruction terminates.

The hash generator may generate a running hash over a sequence of instructions in the order committed, each sequence being terminated with a control flow instruction, and all of the instructions being in the control flow path. The hash may thus be generated as a running hash over a sequence of instructions in the order committed, each sequence of instructions being terminated with a control flow instruction, and all of the instructions being in the control flow path. The running hash may be reset at the entry point of a software module or when a flow control instruction that terminates a sequence of instructions successfully commits.

The processor may further comprise a register configured to store an address of a last control transfer instruction, containing the address of the last committed control transfer instruction or the entry point into a sequence of instructions, if a control transfer instruction has not been encountered after commencing execution of the sequence of instructions. When the flow control instruction at the end of a sequence of instructions is to be committed, an entry in a table for the respective sequence of instructions is looked up using an address of the flow control instruction that terminates the sequence. The method may thus further comprise looking up an entry in a table for the respective sequence of instructions using an address of the flow control instruction that terminates the sequence, when the flow control instruction at the end of a sequence of instructions is committed. Thus, a register may store an address of last control transfer instruction, containing the address of the last committed control transfer instruction or the entry point into the sequence of instructions, if a control transfer instruction has not been encountered after commencing execution of the sequence of instructions. The values stored in the table may be compared in parallel against a value in the register.

The signal may be selectively generated if and only if exactly one of these addresses stored in the table matches the value stored in the register, and the verification logic compares a generated hash with a corresponding entry in the table. The signal may be selectively suppressed except when a single value in the table matches the value stored in the register.

The hash generator may generate a hash as, for example: a function of a set of complete bit patterns that represent individual instructions, as a function of a subset of each of a set of complete bit patterns representing individual instructions; or as a function of all or a portion of a set of bit patterns representing individual instructions and respective addresses of the individual instructions.

The sequence of instructions may be associated with an identifier based on an address of a first instruction or a last instruction of the sequence of instructions.

A cache may be provided configured to cache a plurality of recently used reference signatures.

The processor may comprise logic configured to prefetch a reference signature associated with a predicted flow control path.

A set associative memory may be provided, configured to cache a plurality of reference signatures in encrypted form or decrypted. A plurality of reference signatures may be cached in encrypted or decrypted form in a set associative memory.

The authorization logic may generate an interrupt, if the correspondence is insufficient, which invokes an appropriate handler that suspends further execution of the sequence of instructions and restores the processor to a known stable state or a previous checkpoint.

The authorization logic may transparently log execution details of the sequence of instructions into a secure memory if the correspondence is insufficient, without producing any updates to an architectural state of the processor.

The hash generator may generate the hash in dependence on an accumulation of sequential flow control signatures in the course of executing a program.

The flow control instruction may correspond to a plurality of reference signatures, corresponding to a plurality of paths that lead into the sequence of instructions which the flow control instruction terminates.

A plurality of reference signatures may be stored in a hash table, indexed according to an address of the flow control instruction. The method may further comprise retrieving a reference signature based on an address of a flow control instruction, from a hash table storing a plurality of reference signatures indexed according to a flow control instruction address.

The reference signatures may comprise at least one of: all or some of the bits in an address of flow control instruction; all or some of the bits in the address of the flow control instruction combined with information that indicates an outcome of an immediately preceding one or more flow control instruction; all or some of the bits in a computed flow control signature; all or some of the bits in the computed flow control signature combined with information that indicates the outcome of the immediately preceding one or more flow control instruction; a suitable combination of bits from the computed signature and the address of the flow control instruction; and a suitable combination of bits from the computed flow control signature and the address of the flow control instruction combined with information that indicates the outcome of the immediately preceding one or more flow control instruction.

The processor may be is configured to receive the reference signature in encrypted form, and to decrypt the reference signature using a secret key.

The processor may also be configured to execute a program, and every legal flow control instruction in the program has a corresponding entry in a table of reference signatures. The method may thus further comprise executing a program, and retrieving from a table of reference signatures of each legal flow control instruction in the program, the reference signature corresponding to the flow control instruction.

The hash generator may comprise a cryptographic hash generator which produces the hash in dependence on an input message and a secret key. The hash generator may alternately produce the hash in dependence on an input message and a public algorithm.

The authorization logic may produce the signal to authorize commitment of the flow control instruction for execution, if there is an exact match between the reference signature and the hash.

A secure cache may be provided, configured to cache a plurality of recently used reference signatures in decrypted form.

A cache entry may be retrieved based on a respective cache entry content. A cache entry may alternately be retrieved based on an address of a corresponding flow control instruction of a respective sequence of instructions.

The processor may be configured to receive the reference signature in an encrypted form, and employ a stored secret key in the processor and cryptographic logic configured to decrypt the reference signature for determination of the correspondence with the hash. The method may thus further comprise receiving the reference signature in an encrypted form, storing a stored secret key, and decrypting the encrypted reference signature for determination of the correspondence with the hash.

The processor may be configured to receive the reference signature in an encrypted form, the processor having a stored key and cryptographic logic configured to encrypt the hash for determination of the correspondence with the encrypted reference signature. The method may thus further comprise receiving the reference signature in an encrypted form, storing cryptographic key, and encrypting the hash for determination of the correspondence with the encrypted reference signature.

The verification may be optionally disabled, to selectively permit processing of instructions for which the hash does not, or is not expected to, match.

The instruction processing pipeline may be configured to selectively commit execution of an instruction independent of the output of the verification logic, and subject to alternate instruction authentication logic. The instruction processing pipeline may be selectively controlled in dependence on a mode, having a first mode in which the instruction processing pipeline processes the sequence of instructions in selectively dependence on the signal, and a second mode in which the instruction processing pipeline processes the sequence of instructions independent of the signal.

An alternate signal may be produced representing an authorization of instruction execution independent of the signal, and the instruction processing pipeline may be controlled dependent on either the signal or the alternate signal.

The processor may store a state of at least one of the verification logic and the authentication logic in a storage location when a context is switched out, and to restore the state of the at least one of the verification logic and the authentication logic from the storage location when the context is resumed.

The instruction processing pipeline may be configured to process at least one instruction to compute a proposed change in state of an external memory, and further comprise logic configured to signal a permitted change in the state of external memory selectively based on the signal from the verification logic.

Further objects will become apparent from a review of the application and claims.

DETAILED DESCRIPTION OF THE PREFERRED EMBODIMENTS

Example 1

Validating the Execution of a Single Module

Within a single software execution module (programs and functions linked statically), the legal control flow paths can be specified as a series of segments from the each entry point to the module to the next instruction that can change the flow of control, as well as between consecutive instructions that can change the control flow. Each segment is essentially a basic block of instructions—with a single entry point and a single exit point. Validating the execution of the program module can be done continuously at run time by computing an MD-5 digest (or another hash function, such as SHA-2 or the proposed SHA-3) on instructions executed at the point when the last instruction in the basic block commits.

The actual behavior of the branch instructions are also recorded to identify the segment (that is basic block) that is entered following a control transfer instruction. These MD-5 digests can be compared at run-time against the corresponding values derived from a reference, validated module. The information for the reference module can be stored in an (encrypted) table, called the validation table.

Figure 2A:
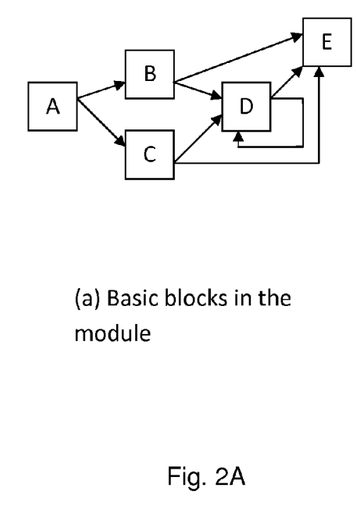
FIGS. 2A and 2B illustrates a simple example module and interrelations, as well as the legal execution paths within this module.
Figure 2B:
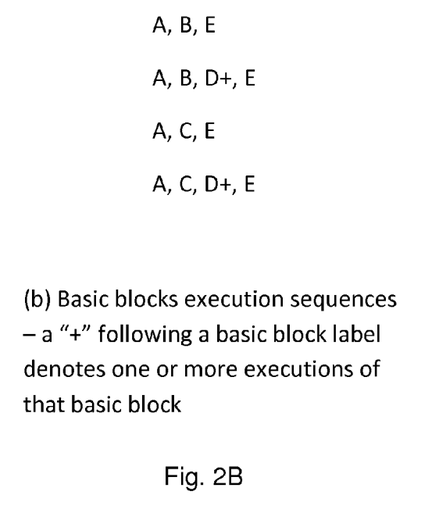

FIG. 2A depicts a simple example, with the basic blocks for a module labeled as A, B, C. D and E. A is the block executed on entry into the module (which has a single entry point) and E is the exit block. The directed edges show the control flow paths. We assume that at the end of each basic block, we have conditional branch instructions labeled bA, bB, bC, bD and bE, respectively. The lower arrow coming out of each basic block shown in FIG. 2A corresponds to the branch at the end of the block being taken, while the upper arrow corresponds to the not-taken path. The legal execution paths within this module are shown in FIG. 2B. The run-time validation of the execution of this module requires the equivalent of the following information to be stored in the validation table:

(i) the address of the branches that leads into each basic block, (ii) the outcome of these branches (taken or not) and, (iii) The MD-5 digest of all instructions in a basic block, including the branch instruction at the end of each basic block.

The validation table has an entry for every instruction that can change the flow of control (these are conditional branch instructions for the example of FIG. 2A). The entry for each such instruction in the validation table needs to store one MD-5 digest for each path that led into the basic block which that instruction terminates. Alternative structures for the validation table are also possible, but an analysis of the SPEC benchmarks showed that this particular format of the validation table is the most efficient one in terms of storage and lookup effort. As a specific example, the VT entry of the branch bD at the end of basic block D needs to store three addresses for the branches bB, bC and bD that lead into the basic block D as well as the MD-5 digest for the basic block D.

The validation of the execution of the module proceeds as follows. A running MD-5 digest is generated as every instruction commits. This MD-5 digest is reset at the entry point of the module or when a control flow instruction that terminates a basic block successfully commits. As a result of this scheme, it is difficult, even if the MD-5 digest is imperfect as a cryptographically sound tool, to produce a malicious or modified set of instructions that would generate the same running MD-5 digest as an authentic set of instructions, given all of the other constraints for a useful program. A successful commitment of a branch instruction according to the present scheme refers to a normal commitment, along with the successful validation of the execution thus far.

The hardware also maintains a register ALCT (Address of Last Control Transfer instruction) containing the address of the last committed control transfer instruction (or the entry point into the module, if we have entered a module and not yet encountered a branch). When the control transfer instruction at the end of a basic block is committed, the VT entry for this branch is looked up using the address of the instruction. All branch addresses (for the predecessor branches or the entry point) stored in this entry are compared, preferably in parallel, against the value of the ALCT register. A content-addressable memory architecture may be used to implement this parallel comparison. If the execution was not compromised, exactly one of these addresses stored in the VT will match the value of the ALCT, validating the control flow path as correct. If no stored address value matches, a situation where execution has been compromised by following a different control flow path has been detected.

The next step in the validation process compares the computed MD-5 digest for the block against what is stored in the retrieved VT entry. A match in this case validates that the execution is validated thus far—the control flow path, as well as the instructions in the last executed basic block (as well as prior ones) are as expected.

Example 2

Validating Cross-Module Executions

When control is transferred from one module to another (as in a call to a dynamically bound library function or a system call), an additional validation is needed to ensure that the target module can be legally called by the program. Within the functions in the called module, validation of the execution at run-time proceeds as for a single module, similar to the scheme described in Example 1.

The control flow signature for a series of instruction can be computed in a variety of ways as described below:

1. As a hash function of the complete bit patterns that represent individual instructions, such as, but not limited to, an MD-5 digest function, or a cyclic redundancy code (CRC) function, of these bit patterns. The bit patterns of the instructions can be padded to equalize (or normalize) their length, for the purpose of computing their signatures. Additionally, some default or pre-assigned initial value can be optionally used as the initial value of the variable used to hold the computed signature.

2. As a hash function of a subset of each of the complete bit patterns representing individual instructions, such as, but not limited to, an MD-5 digest function or a cyclic redundancy (CRC) function of these bit patterns. The bit patterns of the instructions can be padded to equalize (or normalize) their length for the purpose of computing their signatures. Additionally, some default or pre-assigned initial value can be optionally used as the initial value of the variable used to hold the computed signature.

3. As a hash function that hashes all or parts of the bit patterns representing individual instructions and additional information, such as, but not limited to, the addresses of the individual instructions. As before, the hash function can be a MD-5 digest or a CRC function or any appropriate function that generates an unambiguous signature.

The control flow signatures can be computed and validated on a per-basic block basis or a cumulative control flow signature maintained as control flows through a series of basic blocks, as the program executes.

Example 3

Variation 1

Control Flow Signatures are Computed and Verified on a Per-Basic Block Basis In this variation, the control flow signatures are computed for the instructions within each individual basic block, and the computed signature for each executed basic block is verified against an expected signature of that basic block. Each computed signature thus has no dependency with the signatures of its preceding basic blocks.

When the control flow signatures are computed and validated on a per basic block basis, each basic block should be identified uniquely. A unique identifier can be assigned for each basic block in the program by the compiler or any software module that identified each basic block in the program and computes their expected signatures. The unique identifier for a basic block can be either the address of its first instruction or the address of the last instruction in the block, or the address on an instruction within the block that triggers the signature validation process for the entire block. These signatures can be stored in an encrypted form, encrypted using a secret key, as a table, with one entry for each unique basic block. The entries can be identified using the unique identifier for each basic block using some appropriate function known to the art.

Additionally, hardware artifacts internal to the processor can be used to cache the encrypted or decrypted forms of the basic block signatures. These expected signatures are fetched from the aforementioned memory-resident table, for potential reuse—in validating signatures for recently-executed basic blocks. Specific variants are:

Signatures can be prefetched into a dedicated processor internal structure as the processor prefetches instructions along a predicted control flow path. The processor internal table for caching basic block signatures can be organized as a set-associative structure or in one of the many forms well known to the art.

As an alternative to this specialized processor-internal cache for holding the basic block signatures, one can use the existing processor caches.

It is also possible to use the specialized processor-internal signature cache along with the normal processor caches.

Example 4

Variation 2

Control Flow Signatures Computed and Accumulated for Verification

In this variation, the control flow signatures are computed and accumulated into a single variable as control flows through each basic block in the course of executing a program. The control flow signature, at any point in this case, is thus a function of the control flow path across all of the basic blocks encountered thus far at this point.

The control flow signature expected at the end of a basic block, say, B is a function of the control flow signature computed at the point of exit from each of its preceding basic blocks that leads into B. If there are N such preceding basic blocks, the expected control flow signatures at the end of the basic block B should have N different values and one of these should match the computed control flow signature. As in the case of Variation 1, similar hardware structures can be used to hold the expected signature. However, instead of one expected signature per control flow instruction at the end of a basic block (as we have in Variation 1), we need to have an efficient way of storing the multiple expected signatures. There are several ways to do this, and such techniques are generally known to those proficient in the art. For example:

Store the signature in a hash table, indexed by the address of the control flow instruction at the end of a basic block, and use a linked list and/or an array to hold the multiple expected signatures ("hash bucket"), starting with the location identified using the hash value computed. The hash function can accept several inputs to compute an index into the hash table:

a) All or some of the bits in the address of the control instruction.

b) All or some of the bits in the address of the control instruction, combined with information that indicates the outcome of the immediately preceding one or more control flow instruction(s).

c) All or some of the bits in the computed control flow signature.

d) All or some of the bits in the computed control flow signature, combined with information that indicates the outcome of the immediately-preceding one or more control flow instruction(s).

e) A suitable combination of bits from the computed control flow signature, and the address of the control flow instruction.

f) A suitable combination of bits from the computed control flow signature, and the address of the control flow instruction, combined with information that indicates the outcome of the immediately preceding one or more control flow instruction(s).

As in Variation 1, dedicated structures or caches can be used to hold the expected signatures within the processor for fast validation of the control flow signatures. An additional structure can be used to speed up the access to the stored expected signatures within the main memory.

Example 5

Decrypting and Using Expected Control Flow Signatures

The various artifacts mentioned above can be implemented outside the CPU core as well. The expected signatures can be decrypted using a secret key (stored in a secure storage) as they are fetched from memory or they can be decrypted when one needs to compare them against a generated control flow signature. The storage for this secret key can be implemented, for example, using the TPM mechanism.

The control flow signatures are computed as the program executes and when a control instruction at the end of a basic block commits, the computed instruction is compared against an expected signature stored within the hardware artifacts, according to the variations mentioned above. If a computed signature does not match the expected signature, normal instruction processing steps are suspended and appropriate actions are taken. These actions include, but are not limited to: Generation of an interrupt to invoke an appropriate handler that suspends further execution of the program and restores the system to a known stable state (or a previous checkpoint); and Transparently logging execution details into a secure log area on detecting the first mismatch, without any updates to the architectural state of the processor/system.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

Example 6

Figure 3:
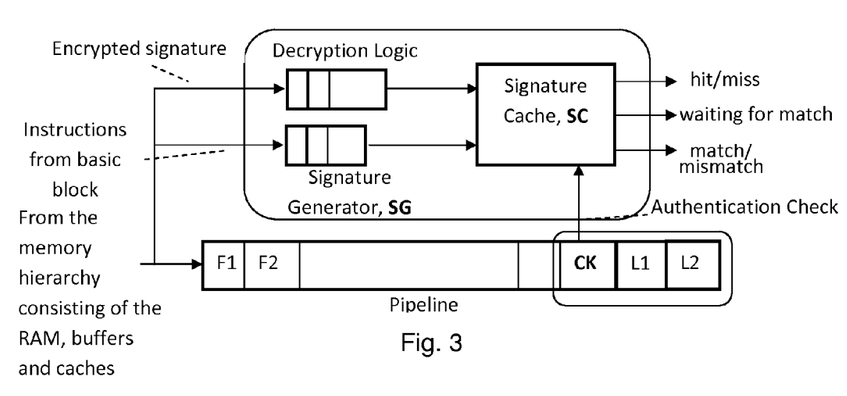
FIG. 3 illustrates a block diagram of an embodiment of the invention

FIG. 3 depicts the generic structure of a pipeline that includes an embodiment of the invention. The reference signatures of each basic block in the program are pre-computed and stored in an encrypted form in memory. As a program is processed by the pipeline, the instructions invoked in the program are fetched from the memory hierarchy in the usual manner, going through one or more levels of caches. The fetched instructions are processed in the usual way by the pipeline and are simultaneously fed into a signature generator (SG) that generates a signature for each basic block of instructions encountered along the path of fetched instructions. As the instruction terminating a basic block is to be committed, the signature generated for the basic block is compared against a reference signature for the same basic block, as stored in an on-chip signature cache (SC). If a reference signature for the basic block is available in the signature cache, it is compared against the signature generated by SG as the last instruction in the basic block is being committed. The authentication succeeds if the generated signature of the basic block, as generated by the SG, matches the signature stored in the signature cache. On a mismatch, the authentication is unsuccessful and corrective actions are taken. If the reference signature is not available in the signature cache, instruction commitment is stalled pending the fetching of a reference signature for the basic block into the signature cache. The location of the encrypted reference signature of the basic block in the memory is computed. This computation is performed by a separate logic (not shown) and can generate the address of the encrypted reference signature of the basic block based on the address of either the first or the last instruction in a basic block. Using the address of the encrypted reference signature for the basic block, the encrypted reference signature for the basic block is fetched from the memory hierarchy, decrypted using on-chip decryption logic as shown in the figure and installed into the signature cache after decryption. If instruction commitment was stalled pending the availability of a reference signature in the signature cache SC, instruction commitment commences after a successful authentication, following the installation of the reference signature from the memory hierarchy.

The processing logic associated with the authentication logic or the signature cache itself can generate signals that indicate whether the reference signature is available in the SC, whether a fetch of the reference signature into the SC is pending and if the authentication check has been successful or not. These signals are used the pipeline control logic.

The processing pipeline may also be augmented by additional pipeline stages in the figure to accommodate any delay in the authentication process (such as the stage shown as CK) or to buffer instructions from the basic block till the authentication of a basic block succeeds (such as the stages shown as L1 and L2).

In alternative embodiments, encrypted reference signatures can be fetched into the SC based on instruction prefetching patterns or as instructions in the basic block are processed in the pipeline, prior to the commitment of the last instruction in the basic block.

Some of the additional logic associated with this technology are shown in the closed ovals in FIG. 3

REFERENCES

Incorporated Herein by Reference

[1] SETI@home. setiathome.ssl.berkeley.edu/.
[2] TCPA. www.trustedcomputing.org/.
[3] A. Carroll, M. Juarez, J. Polk, and T. Leininger. Microsoft Palladium: A business overview, August 2002. Microsoft Press Release.

[4] B. Gassend, D. Clarke, M. Van Dijk, and S. Devadas. Controlled physical random functions. In *Proceedings of the 18th Annual Computer Security Applications Conference*, December 2002.

[5] D. Lie, C. A. Thekkath, M. Mitchell, P. Lincoln, D. Boneh, J. C. Mitchell, and M. Horowitz. Architectural support for copy and tamper resistant software. In *Proceedings of Conference on Architectural Support for Programming Languages and Operating Systems (ASPLOS)*, pages 168-177, 2000.

[6] U. Maheshwari, R. Vingralek, and W. Shapiro. How to build a trusted database system on untrusted storage. In *Proceedings of the 4th USENIX Symposium on Operating Systems Design and Implementation*, pages 135-150, October 2000.

[7] S. W. Smith and S. H. Weingart. Building a high performance, programmable secure coprocessor. In *Computer Networks (Special Issue on Computer Network Security)*, volume 31, pages 831-860, April 1999.

[8] E. Suh, D. Clarke, B. Gassend, M. van Dijk, and S. Devadas. The AEGIS processor architecture for tamper evident and tamper resistant processing. Technical Report LCS-TM-461, Massachusetts Institute of Technology, February 2003.

[9] E. Suh, D. Clarke, B. Gassend, M. van Dijk, and S. Devadas. Hardware mechanisms for memory authentication. Technical Report LCS-TM-460, Massachusetts Institute of Technology, February 2003.

[10] S. Weingart. Physical security for the µABYSS system. In *Proceedings of the IEEE Computer Society Conference on Security and Privacy*, pages 38-51, 1987.

[11] S. White, S. Weingart, W. Arnold, and E. Palmer. Introduction to the Citadel architecture: security in physically exposed environments. Technical Report RC16672, IBM Thomas J. Watson Research Center, March 1991.

[12] B. Yee. *Using secure coprocessors*. PhD thesis, Carnegie Mellon University, May 1994.

What is claimed is:

1. A processing method, comprising:
 receiving a sequence of instructions comprising a terminal flow control instruction for execution by an automated hardware processor having an automated instruction processing pipeline supporting speculative concurrent partial execution of a plurality of instructions, wherein the automated instruction pipeline receives an input to selectively verify commitment of execution of the sequence of instructions comprising the terminal control flow instruction, and if verification is denied, to take an exception action which does not commit execution of the sequence of instructions comprising the terminal control flow instruction, wherein the automated hardware processor commences speculative execution of an unverified sequence of instructions, deferring commitment of execution until verification is successful, without permitting unverified sequences of instructions comprising a terminal flow control instruction to commit execution, wherein the pipeline has a pipeline delay period such that receipt of verification within the pipeline delay period results in commitment of execution without stalling, and receipt of verification beyond the pipeline delay period results in stalling of commitment of execution;
 generating a first hash associated with execution of the sequence of instructions within the automated instruction processing pipeline;
 securely receiving a reference signature corresponding to a second hash of a verified corresponding sequence of instructions;
 determining a correspondence between the first hash and the reference signature within the pipeline delay period for at least one reference signature; and
 selectively producing a signal, in dependence on a correspondence of the first hash with the reference signature, representing verification, wherein the input to selectively permit commitment of execution is produced based on at least the signal.

2. The method according to claim 1, wherein the reference signature is encrypted, further comprising decrypting the encrypted reference signature with a secret key stored in a secure storage location.

3. The method according to claim 1, wherein the reference signature is stored in a secure writable non-volatile memory on a circuit integrated with the instruction processing pipeline.

4. The method according to claim 1, wherein the sequence of instructions comprises a sequence of instructions from an entry point to a next subsequent branch point.

5. The method according to claim 1, wherein the reference signature corresponds to a sequence of instructions between expected consecutive branch points without unexpected flow control instructions.

6. The method according to claim 1, wherein the signal selectively authorizes commitment of the flow control instruction, and a correspondence between the first hash and the reference signature is insufficient to authorize the commitment of execution of the flow control instruction if there is present in the sequence of instructions an unexpected flow control instruction between expected consecutive branch points.

7. The method according to claim 1, wherein a sequence of reference signatures are stored in the memory for verifying consecutive segments of a program at runtime.

8. The method according to claim 1, wherein the reference signature is generated by execution of a reference version of an executable program from which the sequence of instructions is derived.

9. The method according to claim 1, wherein each legal flow path within a single execution module is specified as a segment from an entry point or instruction that can change the flow of control to a next instruction that can change the flow of control, and wherein each segment has a predetermined reference signature.

10. The method according to claim 1, wherein the first hash is calculated by a hash generator which computes a signature which is unique to the sequence of instructions.

11. The method according to claim 1, wherein the first hash is produced by hashing at least codes corresponding to instructions executed at the point when the last instruction in the sequence of instructions commits.

12. The method according to claim 11, wherein the first hash is produced by hashing at least codes corresponding to a behavior of the flow control instruction.

13. The method according to claim 1, wherein a plurality of reference signatures are stored in encrypted form in a table.

14. The method according to claim 13, wherein the table has an entry for a plurality of flow control instructions in a program module that can change the flow of control, wherein the entry for each flow control instruction in the table stores one reference signature for each path that leads into the sequence of instructions which that instruction terminates.

15. The method according to claim 1, wherein the first hash is generated as a running hash over a sequence of instructions in the order committed, each sequence of instructions being terminated with a control flow instruction, and all of the instructions being in the control flow path, wherein the running hash is reset at the entry point of a software module or when a flow control instruction that terminates a sequence of instructions successfully commits.

16. The method according to claim 1, wherein a register stores an address of a last control transfer instruction, containing the address of the last committed control transfer instruction or the entry point into the sequence of instructions, if a control transfer instruction has not been encountered after commencing execution of the sequence of instructions.

17. The method according to claim 16, further comprising looking up an entry in a table for the respective sequence of instructions using an address of the flow control instruction that terminates the sequence.

18. The method according to claim 16, further comprising comparing a value in the register in parallel against a plurality of entries stored in the table.

19. The method according to claim 18, wherein the signal is selectively generated if and only if exactly one of the addresses stored in the table matches the value stored in the register, and the verification logic compares a generated first hash with a corresponding entry in the table, wherein the signal is selectively suppressed except when a single value in the table matches the value stored in the register.

20. The method according to claim 1, wherein the first hash is a function of a subset of each of a set of complete bit patterns representing individual instructions.

21. The method according to claim 1, further comprising prefetching a reference signature associated with a predicted flow control path, such that said signal is available to control commitment of execution of the terminal control flow instruction without stalling.

22. The method according to claim 1, further comprising generating an interrupt, if the correspondence is insufficient, which invokes an appropriate handler that suspends further execution of the sequence of instructions, and restoring a known stable state or a previous checkpoint.

23. The method according to claim 1, further comprising logging execution details of the sequence of instructions into a secure memory if the correspondence is insufficient, without producing any updates to an architectural state.

24. The method according to claim 1, further comprising generating the first hash in dependence on an accumulation of sequential flow control signatures in the course of executing a program.

25. The method according to claim 1, wherein the flow control instruction corresponds to a plurality of reference signatures, corresponding to a plurality of paths that lead into the sequence of instructions which the flow control instruction terminates.

26. The method according to claim 1, further comprising retrieving a reference signature based on an address of a flow control instruction, from a hash table storing a plurality of reference signatures indexed according to a flow control instruction address.

27. The method according to claim 26, wherein the reference signatures comprise at least one of:
  all or some of the bits in an address of a flow control instruction;
  all or some of the bits in the address of the flow control instruction combined with information that indicates an outcome of an immediately preceding one or more flow control instructions;
  all or some of the bits in a computed flow control signature;
  all or some of the bits in the computed flow control signature combined with information that indicates the outcome of the immediately preceding one or more flow control instructions;
  a suitable combination of bits from the computed signature and the address of the flow control instruction; and
  a suitable combination of bits from the computed flow control signature and the address of the flow control instruction combined with information that indicates the outcome of the immediately preceding one or more flow control instructions.

28. The method according to claim 1, further comprising executing a program, and retrieving from a table of reference signatures of each legal flow control instruction in the program, the reference signature corresponding to the flow control instruction.

29. The method according to claim 1, wherein the first hash comprises a cryptographic hash produced in dependence on an input message and a secret key.

30. The method according to claim 1, further comprising receiving the reference signature in an encrypted form, storing a stored secret key, and determining the correspondence of the reference signature with the first hash.

31. The method according to claim 1, further comprising selectively controlling the automated instruction processing pipeline in dependence on a mode, having a first mode in which the automated instruction processing pipeline processes the sequence of instructions dependent on the signal, and a second mode in which the automated instruction processing pipeline processes the sequence of instructions independent of the signal.

32. The method according to claim 1, further comprising producing an alternate signal representing an authorization of instruction commitment of execution independent of the signal, and controlling the automated instruction processing pipeline dependent on either the signal or the alternate signal.

33. The method according to claim 1, further comprising storing a state of at least one of the verification logic and the authentication logic in a storage location when a context is switched out, and restoring the state of the at least one of the verification logic and the authentication logic from the storage location when the context is resumed.

34. The method according to claim 1, further comprising processing with the automated instruction processing pipeline at least one instruction to compute a proposed change in a state of an external memory, and signaling a permitted change in the state of the external memory selectively based on the signal from the verification logic.

35. A method for selectively controlling processing of a sequence of instructions having a flow control instruction, comprising:
  providing a hardware processor having an instruction decode and execution pipeline having a plurality of successive stages for concurrent decoding and partial execution of a plurality of instructions, the sequence of instructions having at least two different associated reference signatures dependent on at least processing of the sequence of instructions that lead to the flow control instruction;
  generating a signature associated with the sequence of instructions within the instruction decode and execution pipeline proximately to and before processing of the sequence of instructions by the instruction decode and execution pipeline;

determining a correspondence between the generated signature and at least one of the reference signatures at or before a time the flow control instruction reaches a terminal stage of the instruction decode and execution pipeline for at least one of the reference signatures; and
controlling the instruction decode and execution pipeline in dependence on the determined correspondence.

\* \* \* \* \*